Oct. 19, 1937.  G. HOGG  2,096,495
METHOD OF CONSTRUCTION
Filed June 22, 1934   2 Sheets—Sheet 1
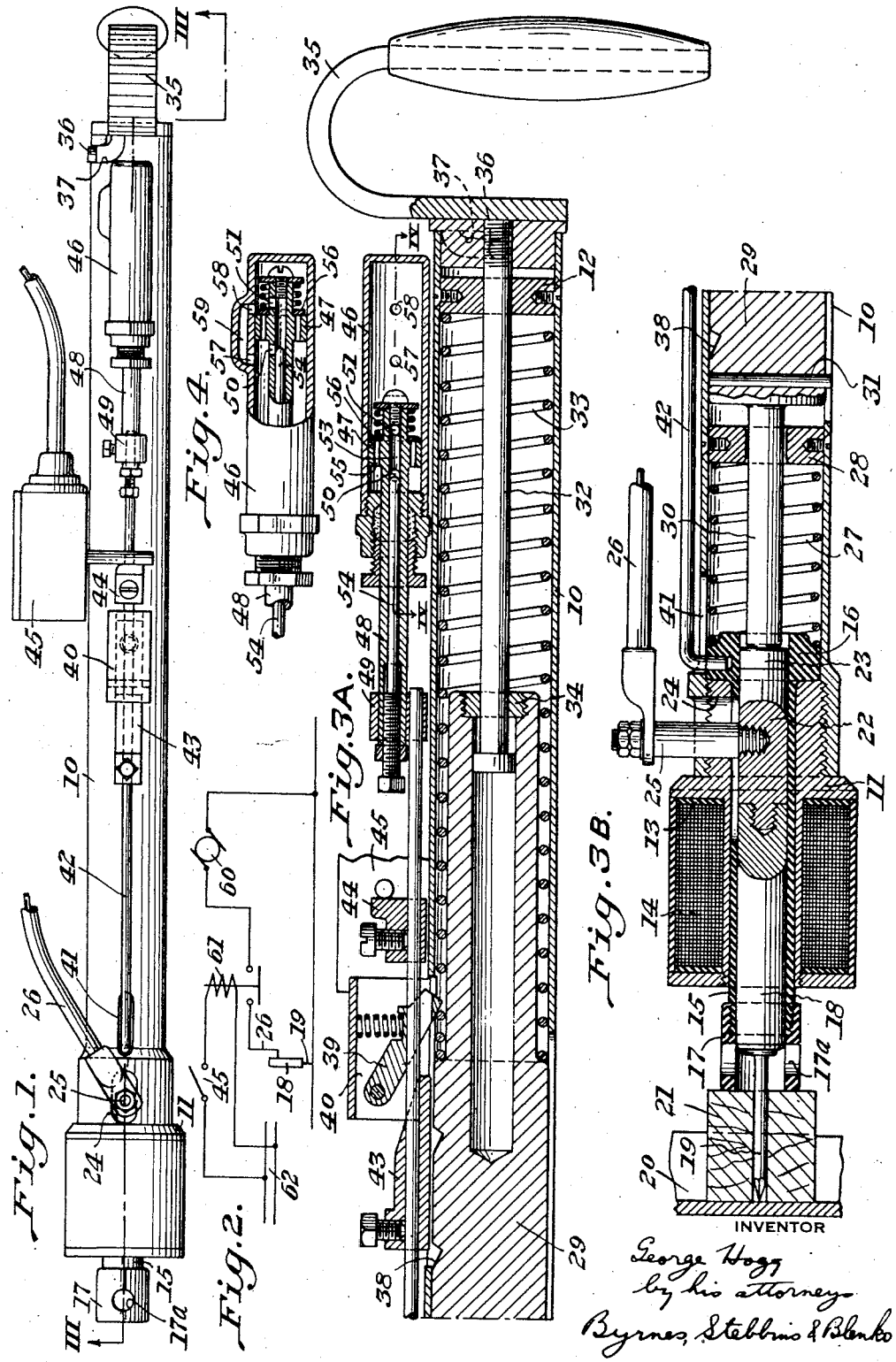
INVENTOR
George Hogg
by his attorney
Byrnes, Stebbins & Blenko Oct. 19, 1937.  G. HOGG  2,096,495
METHOD OF CONSTRUCTION
Filed June 22, 1934   2 Sheets-Sheet 2

INVENTOR
George Hogg
by his attorneys
Byrnes, Stebbins & Blenko

Patented Oct. 19, 1937

2,096,495

UNITED STATES PATENT OFFICE 2,096,495

METHOD OF CONSTRUCTION

George Hogg, Forest Hills, Pa., assignor to Jones & Laughlin Steel Corporation, Pittsburgh, Pa., a corporation of Pennsylvania Application June 22, 1934, Serial No. 731,913

10 Claims. (Cl. 219—10)

My invention relates to the attachment of structural elements one to another, and particularly, to the attachment of elements of wood, pre-cast concrete, gypsum, sheet metal, or the like, to metallic members such as steel framing.

Heretofore it has been necessary to resort to various expedients in order to attach structural elements of wood or other material to steel frame buildings. In certain instances, for example, it has been necessary to drill holes in the framing and bore similar holes in the wood or other members for bolting thereto. Various types of clips, hangers and fasteners, furthermore, have been developed to make possible the use of steel framing in structures where considerable amounts of wood or other structural members are employed. These expedients, of course, are quite costly and their use has been limited by that fact.

I have invented a method of attaching members such as structural units one to another, which entirely overcomes the above mentioned objections in previous practices, and provides a cheap permanent fastening which can be effected in a minimum of time with little or no preliminary work, and without the necessity for exact dimensions.

In accordance with my invention, I secure a structural unit such as a wood member, to a support or frame of metal such as steel, by passing a fastener, such as a nail, through the wood member, until its point engages the frame member, and then effecting a weld between the nail or other fastener and the frame. The wood member may be bored to receive the nail or, alternatively, the nail may be driven through the wood member into contact with the metal frame.

Specifically, the weld is effected by connecting the fastener and the frame member in an electric circuit and causing current to flow therethrough in sufficient magnitude to fuse the end of the nail and create an arc between the support or frame member and the nail. If the arc is maintained, the fusing of the shank of the nail continues and a fused spot develops on the frame member. When the fusion has proceeded to a desirable extent, the nail or fastener may be thrust home against the fused spot on the frame and a tight weld is formed almost instantaneously. The welding current, of course, is terminated as the weld is completed.

For a complete understanding of my invention, I shall disclose herein a tool for carrying out the method. This tool is not my sole invention, but is described and claimed in a co-pending application Serial No. 731,912, filed June 22, 1934, by me, John W. Free et al, for improvements in Welding tool and method. A present preferred embodiment of the tool and a preferred practice of my invention are illustrated in the accompanying drawings. In the drawings—

Figure 1 is a plan view of the tool;

Figure 2 is a schematic diagram of certain connections extending from the tool;

Figure 5:
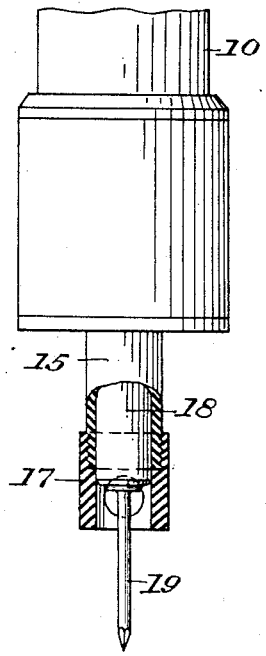
Figure 6:
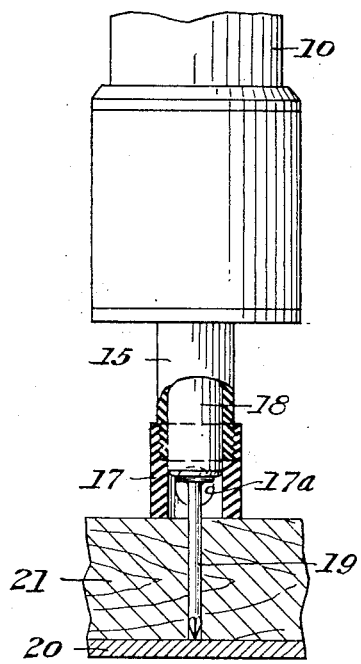
Figure 7:
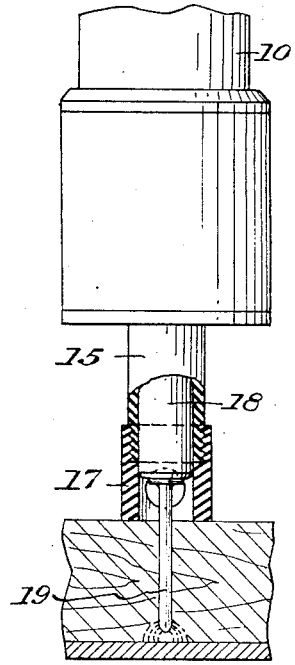
Figure 8:
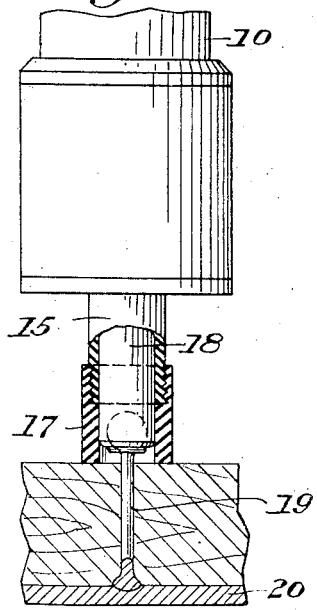
Figure 9:
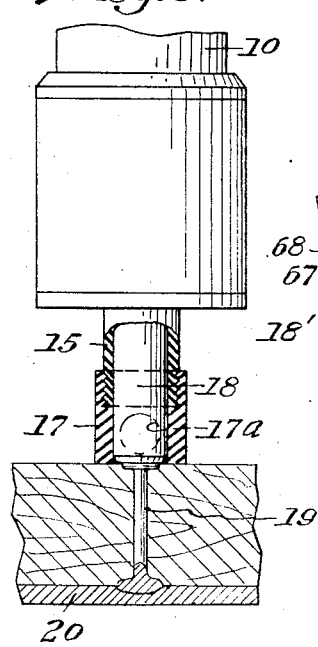

Figures 3a and 3b together constitute a longitudinal sectional view to enlarged scale on the line III—III of Figure 1;

Figure 4 is a partial sectional view along the line IV—IV of Figure 3a;

Figure 5 shows the tool with a fastening nail held thereto by magnetic attraction;

Figure 6 shows the insertion of the nail through the hole in the member to be fastened until it engages the supporting or frame member;

Figure 7 shows the first stage of the welding operation after the fusing of the nail point;

Figure 8 shows a later stage in the welding operation;

Figure 9 shows the completion of the weld; and

Figure 10:
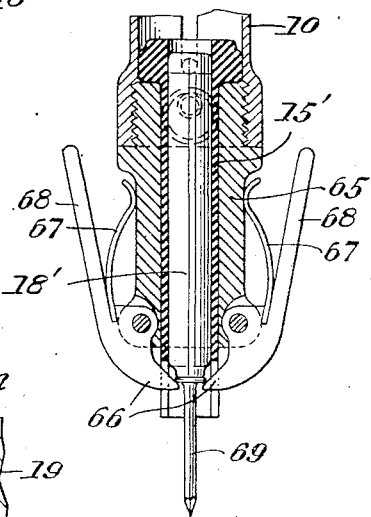

Figure 10 is a partial sectional view similar to Figure 3b, showing a modified construction.

Referring now in detail to the drawings, the tool comprises a barrel 10 having a head 11 of brass or other non-magnetic material threaded into one end and a plug 12 closing the other end. The head 11 has a spool portion 13 for receiving a magnet coil 14. A sleeve 15 of insulating material is reciprocable axially of the head 11 and has an enlargement 16 at one thereof. The sleeve 15 extends outwardly of the spool 13 and has a removable nipple 17 of insulating material threaded thereon. The nipple 17 has radial ports 17a therein.

A plunger 18 is reciprocable in the sleeve 15 and is of magnetic material to serve as a core for the coil 14. When the plunger 18 is magnetized by energization of the coil 14, it is effective to hold a nail 19 or other fastening means of magnetic material to the plunger prior to the formation of a weld between the end of the nail and a metallic supporting member such as an angle 20 for a member to be attached thereto such as a furring strip 21.

An extension plug 22 preferably of non-magnetic material is secured to the plunger 18 and a head 23 of steel is attached to the plug 22. A radial bore 24 is formed in the head 11 to receive a terminal post 25 threaded into the plug 22. A welding current supply conductor 26 is connected to the post 25. The sleeve 15 and its enlargement 16 are normally forced outwardly of the barrel 10 by a spring 27 bearing on the enlargement 16 and on a plug 28 secured in the barrel at a point spaced inwardly from the end thereof.

A hammer 29 is reciprocable in the barrel 10 and has a projection 30 extending through the plug 28 for engagement with the head 23 on the plug 22 to deliver a blow to the plunger 18. A pin 31 extending transversely of the hammer slides in a slot in the barrel to prevent rotation of the hammer relative thereto. The rear end of the hammer is bored out to receive an enlarged head formed at the end of a pull rod 32. A spring 33 normally forces the hammer 29 to the illustrated position, but it may be retracted, however, by the pull rod 32. When the latter is withdrawn, its head engages a plug 34 threaded in the bore in the hammer 29. A handle 35 is attached to the end of the rod 32 for convenience in setting the hammer. A pin 36 on the handle 35 and a slot 37 in the end of the barrel permits the handle to be locked in its inner position.

The hammer 29 is notched at intervals as at 38. These notches are adapted to cooperate with a detent 39 pivoted in a bearing 40 attached to the barrel 10. When the hammer 29 has been withdrawn by pulling on the handle 35 until the detent 39 engages one of the notches 38, the hammer is held in retracted position until tripped, as will be described later, and the handle may be thrust home and locked.

The barrel 10 is slotted at 41 and a push rod 42 extending along the barrel 10 has one end bent over to enter the slot 41 and a radial bore in the enlargement 16 of the sleeve 15. A tripper 43 is adjustably secured to the push rod 42 for engaging the detent 39 after a predetermined movement of the barrel 10 relative to the sleeve 15. The push rod 42 also carries a tripper 44 for operating a control switch 45 secured to the barrel 10.

A fluid check cylinder 46 is secured to the handle end of the barrel 10 and is provided with a piston 47 having a rod 48 extending outwardly thereof and connected to the end of the push rod 42 by a clamp 49. Transverse bores 50 and 51 through the piston rod 48 on opposite sides of the piston 47 communicate with an axial bore 53 therethrough. A stem 54 is adjustable in the bore 53 for partially closing the inner section between the bore 50 and the bore 53. Axial bores 55 through the piston 47, together with a spring pressed valve disk 56, constitute a check valve for the piston. Ports 57 and 58 in the wall of the cylinder 46 are in communication through a by-passing passage 59.

Before describing the operation of the invention, it will be desirable to refer briefly to Figure 2. As there shown, a generator 60 or other convenient source of welding current has one terminal grounded on the frame or support exemplified by the angle 20, to which the fastening member or nail 19 is to be welded. The other terminal of the generator is adapted to be connected to the conductor 26 which is in contact with the plunger 18, by the operation of a contactor 61 controlled by the switch 45. The control circuit including the switch 45 and the operating coil of the contactor 61 may be connected to any convenient supply source indicated at 62. It will be obvious that when the switch 45 is closed, the contactor 61 will operate to connect the plunger 18 to the generator so that as soon as a nail or other fastener carried by the plunger 18 makes contact with the frame member 20, welding current will flow with results to be described hereafter.

The members to be secured to the metal frame or supports are preferably bored to receive the nails or other fastening members. While we have taken as an example, the attachment of a wood furring strip 21 to an angle 20, it will be apparent that the invention may be used for the attachment of members of almost any character to a metal frame or support. Examples of such materials of other characters are pre-cast concrete or gypsum planks or any other composition of non-conducting character. Instead of having the holes for the nails or fastening members bored in advance, it is possible to drive the nails as in the case of wood members.

In the preferred use of the invention, however, the holes in the member to be attached will be bored first and a nail applied to the end of the plunger 18 to be held thereon by the magnetization effected by the coil 14. The hammer 29 is then set or cocked and the switch 45 closed. The nail is then inserted in the hole, although the reverse procedure may be followed, namely, the insertion of the nail and then the placing of the end of the plunger 18 on the nail head. The length of nail used will generally be in proportion to the thickness of the member being attached, so that a sufficient length of the latter projects to provide material for the weld.

The switch 45 having been closed, forward movement of the tool causes the nipple 17 to engage the strip 21. The spring 27 is compressed, and the engagement of the plunger with the nail and the nail with the frame member 20 completes the welding circuit whereupon current begins to flow therethrough.

The initial result of the flow of welding current is the fusion of the point of the nail 19. This leaves a slight gap between the end of the nail and the angle 20, and an arc is sprung across this gap. After contact has been made, the operator continues to push on the handle 35. The nipple 17 prevents movement of the sleeve 15 and the push rod 42. The rest of the tool, however, including the cylinder 46, moves toward the work as pressure is applied. Because of the restricted opening between the bore 50 and the bore 53 in the piston rod 48, fluid in the check cylinder 46 flows slowly from one side of the piston to the other. Regardless of the amount of pressure applied to the handle 35, therefore, the movement of the barrel 10 of the tool toward the work is substantially uniform.

The stem 54 is adjusted so that the rate of travel of the barrel will be such as to maintain a substantially constant arc gap between the fused end of the nail 19 and the work 20. During the maintenance of the arc, of course, a fused spot forms on the support member opposite the fused end of the nail. By the time this spot has been properly fused, the piston 47 in the cylinder 46 opens the port 57 so that the fluid remaining behind the piston is quickly released, with the result that the entire tool moves forward without the restraining effect of the fluid check.

This accelerated movement of the tool is communicated to the plunger 18 and the nail 19 to bring the fused end of the nail and the fused spot on the support together. By this time, the tripper 43 has lifted the detent 39 out of its notch 38 in the hammer 29, and the latter, being released, delivers a forging blow through the projection 30 to the plunger 18, completing the weld between the nail and the frame member 20 and establishing a permanent connection therebetween. At the same time, the tripper 44 opens the switch 45. The contactor 61 thereupon opens to cut off the welding current. Any gases generated during the continuance of the arc are permitted to escape through the port 17a.

After the completion of one operation, the hammer is re-set, the switch 45 closed and the tool is then ready for the next operation as has already been described.

From the foregoing description of the operation of the invention, it will be apparent that a method of welding including several stages is performed thereby. These stages are shown in Figures 5 through 9. Figure 9 illustrates the application of the nail 19 to the plunger 18 which is magnetized by the coil 14. As previously explained, of course, the nail may be inserted in the work first and the plunger guided onto the nail. In either case, the second state of the operation, shown in Figure 7, positions the nail 19 with its point on the frame member 20.

Assuming that the welding circuit has been completed by the closing of the control switch, welding current starts to flow as soon as the nail point engages the angle 20. Because of the small cross section of the nail point, fusion takes place almost immediately. This creates an arc gap between the nail 19 and the frame member 20 as shown in Figure 7. The maintenance of the arc fuses the nail back further and further from its point and also develops a fused spot in the member 20 opposite the nail. The nail is fed downwardly as fusion continues. When a sufficient portion of the nail length has been fused off, the arc gap is closed as shown in Figure 8, by forcing the nail down so that its fused end engages the fused spot on the member 20.

Under these conditions, the delivery of a sharp blow to the nail head by the tripping of the hammer sets the nail with the top of its head flush with the surface of the strip 21, and at the same time drives the fused end of the nail against the fused spot of the angle 20 with sufficient force to effect a sound, tight weld.

Figure 10 shows a mechanical chuck or holder which may be substituted for the magnet 14 when non-ferrous nails are used. The chuck comprises a sleeve 65 threaded onto the end of the barrel 10, for reciprocably receiving the sleeve 15' and the plunger 18'. Jaws 66 are pivoted on the end of the sleeve 65 and are urged to closed position by springs 67. The springs engage rearward extensions 68 on the jaws 66, by which the latter may be retracted for the insertion of a fastener such as the nail shown at 69. The jaws serve in an obvious way to hold the nail in contact with the end of the plunger 18' preparatory to welding in the manner already described. The sleeve 15' is slotted at its end to permit entry of the jaws 66.

If the member to be attached to the metal frame is also of metal, the nail shank must be coated with insulation, the point being left exposed, to prevent shunting of the welding current before reaching the end of the nail. Alternatively, an insulating sleeve somewhat shorter than the nail shank, may be placed thereon before inserting the nail in the preformed hole in the member to be attached.

It will be apparent that the method of my invention provides for the rapid attachment of members such as structural units of wood or other material to a support or frame of metal. The operation is quite rapid and skilled labor is not necessary to carry it out. A fastening means such as a nail can be attached to a steel member by my method at almost any desired point. It is not necessary, furthermore, that the fastening means be spaced along the members with any great deal of precision, as in the case where bolt holes in the wood and steel members must register.

The strength of the weld is such that under test, the head of the nail has been found to fail under tension before the weld.

While I have illustrated and described herein a preferred form of tool for carrying out the method claimed, it will be apparent that the method is not limited to performance by any specific tool and may be carried out by a variety of means or even manually, without special tools of any kind.

I claim:

1. In a method of securing one member to another, the steps including inserting a fastener through one member into engagement with the other, striking an arc between the fastener and said other member, applying a force tending to advance said fastener, checking said force to cause the fastener to advance at a substantially uniform rate, and terminating said checking to permit said force to exert an impact blow on the fastener, with sufficient force to draw said one member into firm engagement with the other.

2. In a method of securing one member to another, the steps including inserting a fastener through one member into engagement with the other, passing current through the fastener and said other member, holding the fastener against movement away from said other member after starting the current, fusing the end of the fastener, thus forming an arc gap between the fastener and said other member, advancing the fastener at a substantially uniform rate as it fuses progressively, and finally applying an impact to the fastener to force the fused end thereof into firm engagement with said other member to effect a weld therebetween, and draw said one member tightly into engagement with the other.

3. In a method of securing one member to another, the steps including inserting a fastener through one member into engagement with the other, passing current through the fastener and said other member, forming an arc therebetween by fusing the end of the fastener, advancing the fastener at a substantially uniform rate as it fuses progressively, and finally exerting a blow on the fastener to force the fused end thereof into firm engagement with said other member to effect a weld therebetween, and draw said one member firmly against the other.

4. In a method of attaching one member to another, the steps including inserting a fastener through one member into contact with the other, circulating an electric current through the fastener and said other member to effect a fusion of the contacting portions thereof, forming an arc between the fastener and said other member, feeding the fastener at a substantially uniform rate toward said other member as the fastener fuses during the continuance of the arc, to maintain the length of the arc gap substantially constant, and driving the fused end of the fastener into the fused portion of said other member to form a weld, with sufficient force to draw the member being fastened into tight engagement with the other member.

5. The method defined by claim 4, wherein the fastener is held against movement away from the members after the initial passage of current, whereby an arc gap is formed between the fastener and said other member by initial fusing of the former, and continuing the current flow until sufficient fusion of the fastener and said other member has occurred to permit the formation of a tight weld therebetween.

6. The method defined by claim 4 characterized by forming an arc gap by initially fusing the end of the fastener engaging said other member to form an arc therebetween, and maintaining the arc length substantially constant during the progress of the fusion of the fastener by advancing the fastener substantially as fast as it is fused.

7. The method of claim 4, characterized by said fastener having a head adapted to engage the first-mentioned member, and closing the arc gap to form a weld as the head engages the first-mentioned member.

8. In a method of securing one member to another, the steps including inserting a fastener through one member into engagement with the other, passing heating current through the fastener and said other member, holding the fastener against movement away from said other member after starting the current, fusing the end of the fastener to form an arc gap between the fastener and said other member, so advancing the fastener as it fuses progressively to maintain said gap, and delivering a blow to the fastener, after the fusion of a spot on said other member, with sufficient force to close said gap, form a weld between said other member and the fastener and draw said one member into tight engagement with the other.

9. In a method of fastening a member to a metallic support, the steps including inserting the pointed end of a pointed fastener through said member, causing the pointed end of the fastener to engage the support, passing electric current through said fastener to fuse the pointed end and create an arc between the fastener and the support, progressively moving the fastener toward the support during the continuance of the arc as the fastener fuses, to maintain the length of said arc substantially constant until a pool of fused metal is formed on said support, and then delivering a blow to the fastener to force the fused end thereof into said pool to effect a weld, and draw said member firmly into engagement with said support.

10. The method defined by claim 8 characterized by said fastener being headed and the arc being continued long enough so that the fastener head engages the member and draws the member toward the support when the fastener is welded to the support.

GEORGE HOGG.